Patented May 4, 1954

UNITED STATES PATENT OFFICE 2,677,678

UNSATURATED BENZOIC ACID DERIVATIVES

Rupert C. Morris, Berkeley, and Vernon W. Buls, Walnut Creek, Calif., assignors to Shell Development Company, Emeryville, Calif., a corporation of Delaware No Drawing. Application March 17, 1953, Serial No. 342,986

7 Claims. (Cl. 260—78.5)

This invention relates to the provision of novel unsaturated benzoic acid derivatives, and it is particularly directed to the provision of compounds wherein the acid is substituted in its nuclear portion with an aliphatically unsaturated radical, as well as of those compounds wherein such nuclear-substituted acids are esterified with an aliphatically unsaturated alcohol. This application is a continuation-in-part of copending application Serial No. 170,254, filed June 24, 1950, as a joint invention of the present applicants, which copending application is now abandoned.

The ester compounds of the present invention may be represented by the following general formula

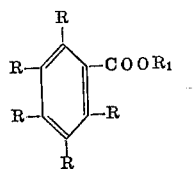

wherein one of the R's is a substituted or unsubstituted aliphatic hydrocarbon radical containing at least one olefinic double bond which is linked to the phenyl nucleus through a non-quaternary carbon atom and the remaining R's are selected from the group consisting of the hydrogen atom, the hydroxyl group and alkyl radicals, and wherein $R_1$ is a substituted or unsubstituted aliphatic hydrocarbon radical containing one or more olefinic double bonds between adjacent carbon atoms, neither of which is directly attached to the oxy atom of the ester. Representative compounds falling within this group are monomeric and polymeric: allyl p-vinylbenzoate, allyl p-methallylbenzoate, butenyl p-methallylbenzoate, hexenyl p-vinylbenzoate, 3-chlorohexenyl p-allylbenzoate, 5-hydroxyhexenyl o-butenylbenzoate, dodecenyl m-vinylbenzoate, 3-methylpropenyl p-allylbenzoate, oleyl p-vinylbenzoate, oleyl p-methallylbenzoate, butenyl p-oleylbenzoate, chloroallyl p-methyallylbenzoate, butenyl p-chloroallylbenzoate. However, a preferred group of compounds coming within this group is made up of those wherein $R_1$ is a 2-alkenyl radical. Representative compounds coming within the scope of this preferred group are monomeric and polymeric: allyl p-vinylbenzoate, methallyl o-vinylbenzoate, 2-butenyl p-methallylbenzoate, allyl o-methallylbenzoate, allyl p-methallylbenzoate, 2-hexenyl p-methallylbenzoate, allyl 2-hydroxy-4-vinylbenzoate, allyl - 2-methyl-4-methallylbenzoate, methallyl 2-ethyl-4-vinylbenzoate, methallyl p-methallylbenzoate, 2-ocentyl 2-hydroxy-4-methallylbenzoate, allyl p-1,3-butadienylbenzoate, methallyl p-crotylbenzoate, chloroallyl p-vinylbenzoate, chloromethallyl p-methallylbenzoate, 2-decenyl p-chloromethallylbenzoate, 4-ethylhepten-2-yl p-allylbenzoate, chloroallyl p-methallylbenzoate, bromomethallyl p-vinylbenzoate, chloroallyl 2-hydroxy-4-methallylbenzoate, 5-hexenyl p-methallylbenzoate, 2,4-pentadienyl p-methallylbenzoate, and 6-hydroxyhexen-2-yl p-methallylbenzoate. These and other ester compounds of the present invention are employed in a wide variety of industrial applications. Many of them form useful components of synthetic drying oils, while others are useful alkyd resin additives and impart improved color as well as color stability to said resins. The present compounds also form useful polymers which may be employed either per se, or along with other polymerizable materials of one type or another in various applications.

A particularly useful group of compounds of the present invention is made up of the esters of p-methallylbenzoic acid, as represented by monomeric and polymeric: allyl p-methallylbenzoate, methallyl p-methallylbenzoate, isopropenyl p-methallylbenzoate, 2-butenyl p-methallylbenzoate, chloroallyl p-methallylbenzoate, chloromethallyl p-methallylbenzoate, bromomethallyl p-methallylbenzoate, and oleyl p-methallylbenzoate. A more preferred group is made up of those esters wherein the acid is esterified with an alcohol or other ester-forming derivative containing an olefinic double bond between carbon atoms neither of which is directly attached to the oxy atom of the ester. Representative compounds falling within this preferred group are monomeric and polymeric: allyl p-methallylbenzoate, methallyl p-methallylbenzoate, 2-butenyl p-methallylbenzoate, 5-hexenyl p-methallylbenzoate, 2,4-pentadienyl p-methallylbenzoate, chloroallyl p-methallylbenzoate, and 6-hydroxy-hexen-2-yl p-methallylbenzoate.

The foregoing compounds, wherein the phenyl nucleus is substituted in the para-position by a methallyl group, are particularly useful when employed (in either the monomeric or polymeric form) as components of drying oils, the methallyl group here appearing to function as a long chain fatty acid, though without the disadvantages of the latter type of additive. These compounds are also particularly useful as components of alkyd resins, where they contribute hardness without sacrifice in drying quality.

p-Methallylbenzoic acid can be prepared by forming a solution of p-chloro-tert-butylbenzoic acid and an equivalent amount of alkali metal hydroxide in water or other inert solvent and then heating the solution at a temperature between 125 and 300° C., and preferably between 175° C. to 225° C., the system necessarily being maintained at an appropriate superatmospheric pressure when water or other solvent boiling below the desired temperature is employed. The p-methallylbenzoic acid, which at the end of the reaction is recovered as the material floating on the surface of the liquid, is formed in accordance with the following equation:

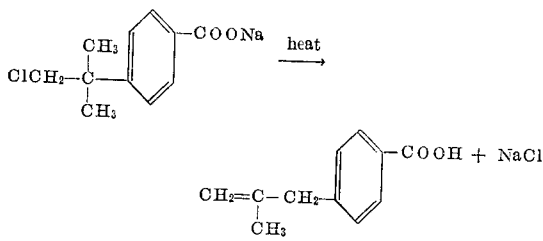

The novel esters of the invention may be prepared by any method adapted to the preparation of such compounds. For example, they are readily prepared by the direct esterification of p-methallyl- or other alkenyl-substituted benzoic acids with an alcohol, an example of this method of preparation being the formation of allyl p-methallyl-benzoate by reacting p-methallylbenzoic acid with allyl alcohol. The reaction formative of the ester proceeds in some measure merely on heating the reactants together in the absence of a catalyst, though improved results are obtained when a catalyst is used and when the reactants are dissolved in benzene or other appropriate solvent capable of forming an azeotrope with the water released during the reaction. Suitable catalysts for this purpose are the mineral acids such as sulfuric, hydrochloric and phosphoric acids, as well as organic acids of the type of p-toluenesulfonic acid and the like. Since many of these ester monomers are capable of being readily polymerized, it is obvious that precautions should be observed to prevent such polymerization when the monomer compounds are desired. Thus, polymerization can be minimized by conducting the reaction at the lowest possible temperatures and for the shortest times commensurate with good product yield. In certain cases it has been advantageous to conduct the reaction in the presence of a polymerization inhibitor such as tannic acid or hydroquinone.

The polymeric compounds of this invention are prepared either from the monomer compounds thereof or directly from the raw materials used in forming the monomers, by methods known in the art. When homopolymers are prepared, no other reactant compound is present, though in forming copolymers an appropriate unsaturated compound of the type to be discussed in the succeeding paragraph is employed. In general, the conditions leading to the formation of the homopolymers are the same as those whereby the monomers are combined with other polymerizable materials to form copolymers, polymerization usually being effected in either case by the application of heat and/or with the addition of a catalyst.

The compounds which may be reacted with the monomers of the present invention to form copolymers thereof are those having at least one aliphatic group of two carbon atoms which are connected together by an olefinic linkage capable of undergoing addition polymerization. One important group of such copolymerizable compounds is that containing in the molecule a single polymerizable olefinic linkage, as represented by styrene, the vinyl halides, the vinylidene halides, vinyl chloride and vinylidene chloride being preferable; the vinyl esters of saturated monocarboxylic acids, methyl acrylate, methyl methacrylate, the allyl halides such as allyl chloride and allyl bromide; and allyl esters of saturated monocarboxylic acids. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon. Another important group of copolymerizable compounds consists of those having in the molecule two or more conjugated, unsaturated, polymerizable carbon-to-carbon linkages such as conjugated butadiene, conjugated chlorobutadiene, isoprene and the other conjugated pentadienes, and conjugated hexadienes, their homologues, analogues and suitable substitution products. A particularly valuable class of copolymers is that formed between ester compounds of the present invention and the allyl esters of aromatic polycarboxylic and ethereal oxygen-containing polycarboxylic acids, e. g., diallyl phthalate and diallyl diglycolate. Copolymers containing from about 5 to 98% by weight of the aliphatically unsaturated benzoic acid ester may be prepared, and preferred copolymers contain from about 25 to 75% by weight of such ester.

As has been noted above, the polymer compounds of the invention are preferably formed in the presence of a polymerization catalyst. Benzoyl peroxide has been found satisfactory for this purpose, as have acetyl peroxide, benzoyl acetyl peroxide, lauryl peroxide, dibutyryl peroxide, succinyl peroxide, sodium peroxide, barium peroxide, tertiary alkyl hydroperoxides such as tertiary butyl hydroperoxide, peracetic acid, perphthalic acid, sodium peroxide, perborates, persulfates, ozone and oxygen. The compounds may also be polymerized in the presence of their own peroxides, or of their ozonides. Another class of polymerization catalysts consists of the di(tertiary alkyl) peroxides, notably di(tertiary butyl) peroxide. Metals and metallic salts may be used as polymerization catalysts. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range.

Polymerization is usually energized by the application of heat, although both heat and light may be used, and in some cases, light alone may be sufficient. Temperatures of between about 60° C. and 250° C. are preferred, although somewhat higher or even lower temperatures can be used on occasion.

The monomeric compounds can be polymerized in the massive state or in the form of dispersions or solutions. Where a dispersion method is employed, it may be desirable to select a dispersing medium insoluble in the catalyst involved. With certain compounds polymerization can be effected in the vapor state. Continuous or discontinuous processes may be used, as may atmospheric, reduced, or superatmospheric pressures. Polymerization may also be carried out under a blanket of an inert gas.

The polymerization reaction can be carried to completion without substantial interruption or it can be stopped at any point short of completion with resultant formation of a partial polymer, i. e., a mixture of both monomer and polymer. This partial polymer mixture may be used as such, or the unreacted monomer may be separated from the mixture by solvent extraction, distillation or other methods. The separated polymer may then be worked up in any known or special manner. In the case of many compounds, particularly in the case of the polymerization of compounds having two or more non-conjugated polymerizable unsaturated linkages in the molecule, the separated polymer may be capable of further polymerization.

The polymers of this invention form an extremely useful group of compounds for which many important uses have already been demonstrated. For example, it is an important characteristic of the polymers (a term which includes both homopolymers as well as copolymers of the ester monomers) that they are compatible with numerous film-forming compounds, including nitrocellulose, the various polymeric vinyl esters such as polyvinyl chloride-acetate, and linseed as well as other natural drying oils, and greatly improve the physical properties of the resulting films. Particularly beneficial results are obtained in the case of nitrocellulose films, for use of the presently disclosed polymers to supply part or all of their resinous content provides films of improved hardness, durability, adhesion and gloss as compared with nitrocellulose films prepared with the conventional alkyd or other resins.

The following examples illustrate the invention in various of its embodiments:

*Example I*

It was desired to prepare p-methylallylbenzoic acid. To this end, 50 g. (0.235 mol) of p-monochloro-tert-butylbenzoic acid (prepared by treating p-tert-butylbenzoic acid in carbon tetrachloride solution with chlorine in the presence of ultraviolet light) were dissolved in 200 cc. of water along with 10 g. (0.25 mol) of sodium hydroxide. When solution was complete, enough acetic acid was added to bring the pH of the liquid to about 6. This solution was then placed in a pressure vessel where it was heated at 200° C. for 4 hours. The p-methallylbenzoic acid formed in this reaction was recovered as the material floating on the aqueous solution. It was taken up in ethanol and decolorized by passage through charcoal, after which the alcohol was evaporated. The residue, which weighed 36.3 g., was crystallized from dilute ethanol and then found to have a melting point of 161.5 to 163.5° C. Elemental analysis and infra-red data indicated the product to be p-methallylbenzoic acid. Its iodine number (g./100 g.) was found to be 146 (calculated value 144). Its acidity (eq./100 g.) was found to be 0.569, with the calculated value being 0.568.

*Example II*

In this operation there were charged to a kettle attached to a separating stillhead 740 g. of p-methallylbenzoic acid, 454 g. of allyl alcohol, 400 g. benzene, and 40 g. of p-toluenesulfonic acid. The solution was refluxed until no further water was recovered in the water-benzene azeotrope. After removing the remaining excess alcohol, the material was fractionated and the allyl p-methallylbenzoate was recovered as a water-white product boiling at 101° C. at 0.2 mm. Hg. pressure. The ester had the following properties: refractive index ($n$ 20/D) 1.5523, iodine No. 223, saponification equivalent 0.463.

*Example III*

The object of this procedure was the preparation of a homopolymer of allyl p-methallylbenzoate. One hundred parts by weight of the monomer, allyl p-methallylbenzoate ($n$ 20/D=1.5388)

was charged into a reaction vessel. The temperature was raised to from about 40° C. to about 50° C. and 3 parts by weight of benzoyl peroxide was added in portions. Then 1 part by weight of di-tert-butyl peroxide was added, and the mixture heated to about 175° C. This temperature was maintained until the mixture in the vessel was a very viscous oil whose index of refraction ($n$ 20/D) =1.5768.

*Example IV*

The object of this procedure was the preparation of a copolymer of allyl p-methallylbenzoate and diallylphthalate. Twenty-five parts by weight of allyl p-methallylbenzoate and 25 parts by weight of diallylphthalate were mixed in a reaction vessel, and the mixture was heated to about 175° C. Then 2 parts by weight of di-tert-butyl peroxide was added, and the temperature of the mixture was maintained at about 175° C. until the desired product was obtained. This product had an index of refraction ($n$ 20/D) =1.5594

*Example V*

A copolymer of allyl p-vinylbenzoate and vinyl chloride is prepared by the following procedure: Place 10 parts by weight of allyl p-vinylbenzoate in a pressure reaction vessel. Add 1 part by weight of benzoyl peroxide and stir well, at the same time cooling the mixture to about the temperature of melting ice. Introduce 8.5 parts by weight of vinyl chloride into the reaction vessel, and slowly raise the temperature to from about 120° C. to about 125° C. Stir the mixture at intervals. When the pressure in the vessel has stabilized, the reaction is substantially complete.

We claim as our invention:

1. Allyl p-methallylbenzoate.
2. A polymer of allyl p-methallylbenzoate.
3. A copolymer of allyl p-methallylbenzoate with another polymerizable organic compound having an aliphatic group of two carbon atoms which are connected together with an olefinic linkage capable of undergoing addition polymerization.
4. The copolymer of allyl p-methallylbenzoate and diallyl phthalate.

5. A compound having the structural formula

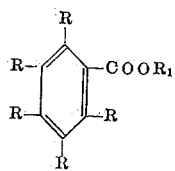

wherein one of the R's is an aliphatic hydrocarbon radical containing at least one olefinic double bond which is linked to the phenyl nucleus through a non-quaternary carbon atom, and wherein the remaining R's are selected from the group consisting of the hydrogen atom, the hydroxyl group and the alkyl radicals, and wherein $R_1$ is an aliphatic hydrocarbon radical containing at least one olefinic double bond between carbon atoms neither of which is directly attached to the oxy atom of the compound.

6. A compound defined in claim 5 in which the group substituted at the para position of the phenyl nucleus is the methallyl group, the symbol R represents in all other cases the hydrogen atom, and the group designated $R_1$ is a 2-alkenyl group.

7. A copolymer of the compound defined in claim 5 with another polymerizable organic compound having an aliphatic group of two carbon atoms which are connected together with an olefinic linkage capable of undergoing addition polymerization.

References Cited in the file of this patent
UNITED STATES PATENTS

| Number | Name | Date |
|---|---|---|
| 2,578,950 | Scheibli | Dec. 18, 1951 |